United States Patent [19]

Ruf

[11] Patent Number: 4,965,137

[45] Date of Patent: Oct. 23, 1990

[54] LIQUID PREPARATION FOR THE PRODUCTION OF ELECTRICALLY CONDUCTIVE AND INFRARED-REFLECTING FLUORINE-DOPED TIN OXIDE LAYERS ON GLASS OR GLASS-CERAMIC SURFACES, AS WELL AS A METHOD FOR THE PRODUCTION OF SUCH LAYERS

[75] Inventor: Erich Ruf, Essen, Fed. Rep. of Germany

[73] Assignee: Th. Goldschmidt AG, Essen, Fed. Rep. of Germany

[21] Appl. No.: 246,427

[22] Filed: Sep. 19, 1988

[30] Foreign Application Priority Data

Oct. 21, 1987 [DE] Fed. Rep. of Germany ....... 3735574

[51] Int. Cl.$^5$ .......................... B32B 15/00; B05D 5/06
[52] U.S. Cl. .................................... 428/432; 427/168; 427/314; 427/427
[58] Field of Search ............... 427/160, 110, 168, 314, 427/427; 65/60.51, 60.52; 428/432

[56] References Cited

U.S. PATENT DOCUMENTS 4,721,632 1/1988 Brown .................................. 427/168
4,725,452 2/1988 Hargreaves et al. ............... 427/168
4,770,901 9/1988 Katoh et al. ......................... 427/168
4,812,332 3/1989 Kerherve et al. .................... 427/168

*Primary Examiner*—Stanley Silverman
*Attorney, Agent, or Firm*—Toren, McGeady and Associates

[57] ABSTRACT

A liquid preparation for the production of electrically conductive and infrared-reflecting, fluorine-doped tin oxide layers on glass or glass-ceramic surfaces is disclosed. The preparation has a content of tin-IV-chlorides, which optionally comprise organic groups. The preparation contains also tin-II-fluoride as the sole doping agent. A preferred preparation comprises 30 to 89% by weight of tin-IV chloride, optionally having organic groups,
1 to 5% by weight of tin-II fluoride,
10 to 55% by weight of a polar organic solvent and
0 to 10% by weight of water.

The inventive preparation is procedurally simple to handle and contains no chemically aggressive or toxic compounds. The components of the preparation are easily accessible, cognate and inexpensive chemicals, yet permit high-grade surface layers to be produced on glass or glass-ceramic. A method for forming the layers is also disclosed.

8 Claims, No Drawings

LIQUID PREPARATION FOR THE PRODUCTION OF ELECTRICALLY CONDUCTIVE AND INFRARED-REFLECTING FLUORINE-DOPED TIN OXIDE LAYERS ON GLASS OR GLASS-CERAMIC SURFACES, AS WELL AS A METHOD FOR THE PRODUCTION OF SUCH LAYERS

FIELD OF THE INVENTION

The invention generally relates to the coating of glass and glass-ceramic surfaces and is particularly directed to a liquid preparation suitable for the formation of electrically conductive and infrared-reflecting fluorine-doped tin oxide layers on such surfaces with a content of tin-IV chlorides, which optionally contain organic groups. The invention is furthermore concerned with a method for the production of such layers with the preparation.

BACKGROUND INFORMATION AND PRIOR ART

It is well known that fluorine-doped tin oxide layers on glass surfaces decrease the electrical resistance of the thusly coated surfaces and increase the infrared reflection. To produce these tin oxide surface layers, a suitable tin compound and a fluorine-emitting compound are brought simultaneously into contact with the surface which is heated to temperatures of 400° to 800° C. The tin compound (base compound) forms then a coherent layer of tin oxide on the surface of the glass or the glass-ceramic. The fluorine-emitting compound (doping agent) causes the tin oxide layer which is being or has been formed to be doped with fluorine. This doping is of decisive importance for the development of the desired properties, such as conductivity and infrared reflection.

The method for producing these fluorine-doped tin oxide layers on suitable surfaces can be carried out in various ways. The tin- and fluorine-containing compounds may be allowed to act from the gas phase on the surface to be improved or the surface may be subjected to a stream of gas, which contains the compounds in the form of a fine powder. From a process technology point of view, the spraying of solutions of these compounds in a suitable solvent is particularly easy to carry out.

This art is dealt with extensively in the patent literature, from which the following Offenlegungsschriften or patents are named as representative.

German Patent 3,010,077 discloses a method for the application, by pyrolysis, on a glass surface of an infrared-reflecting layer of tin oxide, doped with a halogen, preferably fluorine. In this method, an organic tin compound (base compound) in powder form with a particle size of less than 20 $\mu$m is applied as a suspension in a gaseous carrier stream in the presence of a halogen compound (doping agent) on the glass surface having a temperature of 400° to 650° C. As halogen compound (doping agent), a pulverulent compound is used, which is suspended in the gaseous carrier for the tin compound (base compound). An example of a base compound is dibutyl tin oxide, while dibutyl tin difluoride is named as doping agent. Base compound and doping agent may also be realized in a single compound, such as ammonium dibutyl tin tetrafluoride. However, it has been ascertained that it is extremely difficult to achieve a reproducible formation of a uniform flow of carrier gas and pulverulent compounds, so that surface layers with constantly changing properties are obtained.

German patent 2,806,468 teaches a method for which dibutyl tin oxide, in the form of a powder dispersed in an anhydrous stream of air, is used as base compound, while the doping agent is a gaseous fluorine compound, which is mixed in with the dispersion shortly before it reaches the discharge nozzle. Anhydrous hydrogen fluoride, $BF_2$, $BrF_5$, $ClF_3$, $SiF_4$, $WF_6$ and $MoF_6$ are named as gaseous fluorine compounds. These gaseous fluorine compounds have the tendency of etching the surface of the glass or glass-ceramic that is to be improved. Moreover, extensive safety precautions have to be taken when using these chemically aggressive and toxic gases. This renders the procedure cumbersome and expensive.

The application of suitable tin compounds and doping agents from the gas phase can be deduced from the European Offenlegungsschrift 0 112 780. In this method, a gaseous mixture of butyl tin trichloride (base compound) and dichlorodifluoromethane (doping agent) is used. Here also, metering problems arise, which lead to surfaces of uneven and inadequate properties. Moreover, the use of dichlorodifluoromethane is undesirable for environmental reasons. A method is disclosed in U.S. Patent 4,293,594, wherein a gaseous mixture of dimethyl tin dichloride and dimethyl tin difluoride is applied in a carrier gas on the surfaces to be improved. However, these compounds are solids and can be converted into the gas phase at high temperatures only.

A liquid preparation for the production of high-grade, fluorine-doped tin oxide layers on glass surfaces is disclosed in the European Offenlegungsschrift 0 158 399. The preparation comprises (a) 1 to 30% by weight of a doping agent based on an organic fluorine compound, selected from trifluoroacetic acid or its anhydride, ethyl trifluoroacetate, trifluoroethanol and pentafluoropropionic acid and (b) 70 to 99% by weight of an organotin compound, selected from alkyl tin trichloride, dialkyl tin dichloride, alkyldichloro tin acetate, alkylchloro tin diacetate, an ester of tin chloride or tin tetrachloride.

This method also does not yet satisfy, since the majority of the fluorine-containing doping agents represent low boiling liquids and therefore largely evaporate at the hot glass surface and, for this reason, are not incorporated in the tin oxide layer. Due to the heat of evaporation of these doping agents, the hot substrate surface is cooled relatively strongly. This leads to a worsening of the properties of the applied layer.

If pentafluoropropionic acid is used, the decomposition at the hot glass surface does not occur quickly enough, so that the tin oxide layer also in this case does not have sufficient functional values. In addition, these compounds are very expensive and injurious to health.

OBJECT OF THE INVENTION

It is therefore the primary object of the present invention to provide solutions of tin compounds as base compounds and fluorine-containing doping agents for the indicated purpose, which are easy to handle from a process-technical point of view, do not contain chemically aggressive or toxic compounds and comprise components made up from easily accessible, cognate, inexpensive chemicals, which nevertheless permit high-grade surface layers to be produced on glass or glass-ceramic. It is also an object of the invention to provide a method of forming superior electrically conductive, infrared reflecting layers on glass or glass-ceramic substrates which is readily performed.

Generally, it is an object to improve on the art of forming such layers and to overcome the disadvantages and drawbacks of the prior art.

SUMMARY OF THE INVENTION

Pursuant to the invention, it has surprisingly been ascertained that the desired properties are superiorly obtained with a liquid preparation, which contains tin-IV chlorides as base compounds and tin-II fluoride as sole doping agent. The tin-IV chlorides may optionally contain organic groups.

The superior effect of the inventive preparation is surprising, especially in light of U.S. Pat. No. 2,566,346. This patent discusses the use of solutions containing inorganic and/or organic tin-IV chlorides as base compounds and antimony fluorides as doping agent. Pursuant to the patent, if such solutions are applied to glass substrates by a spray-atomizing procedure, tin oxide layers are formed which do not exhibit appreciable infrared reflection values or low surface resistance values.

Moreover, aqueous or aqueous-alcoholic tin-II fluoride solutions alone, that is, without the additional presence of tin-IV chlorides with or without organic groups, can be applied only as very dilute solutions on the glass surface. The resulting tin oxide layers exhibit totally inadequate values for infrared reflection and surface resistance. Furthermore, such solutions of tin-II fluoride as the sole active component do not decompose satisfactorily at the hot substrate surface, so that interfering decomposition residues build up on the substrate surfaces as the amount used increases.

It is particularly advantageous, that the solutions are devoid of hydrofluoric acid and acidic fluoride compounds and thus do not attack or damage materials nor are injurious to health.

A preferred example of an inventive preparation is a solution of
 30 to 89% by weight of tin-I1; chlorides, which optionally comprise organic groups,
 1 to 5% by weight of tin-II fluoride,
 10 to 55% by weight of a polar organic solvent and
 0 to 10% by weight of water.

Aside from tin tetrachloride, suitable base compounds are alkyl tin trichloride, dialkyl tin dichloride, dialkylchloro tin acetate and alkylchloro tin diacetate, in which the alkyl group in each case is a group with 1 to 8 carbon atoms and especially with 4 carbon atoms and preferably is n-butyl.

Especially preferred therefore is an inventive preparation which comprises
 30 to 89% by weight of tin tetrachloride or alkyl tin trichloride,
 1 to 5% by weight of tin-II fluoride,
 10 to 55% by weight of a polar organic solvent and
 0 to 10% by weight of water.

Another particularly preferred preparation comprises:
 30 to 89% by weight of tin tetrachloride or butyl tin trichloride,
 1 to 5% by weight of tin-II fluoride,
 10 to 55% by weight of ethanol and/or ethyl acetate and
 0 to 10% by weight of water.

As polar organic solvents, lower aliphatic alcohols, especially ethanol, and low-boiling esters, especially ethyl acetate, or ketones, such as methyl isobutyl ketone, come into consideration.

When using ethanol as solvent, it is possible to produce anhydrous preparations. Appropriate solutions of tin-IV chlorides, optionally containing organic groups, in ethanol can be obtained by the addition of the required amount of solid tin-11 fluoride the solution and stirring the solution after the addition of said tin-11 fluoride for 1 to 2 hours.

An anhydrous preparation may thus have the following composition:
 30 to 89% by weight of tin tetrachloride or butyl tin trichloride,
 1 to 5% by weight of tin-II fluoride and
 10 to 65% by weight of ethanol.

A further aspect of the present invention is to provide a method for the production of electrically conductive and infrared-reflecting tin oxide layers on glass or glass-ceramic substrates by spraying an organic solution of tin-IV chlorides, optionally containing organic groups, as tin oxide layer-forming agents and fluorine-containing doping agents on the substrate surfaces, which have a temperature of 400° to 800° C. The method is characterized in that tin-II fluoride is the sole doping agent contained in the solution. Advantageously, the above-described preferred preparations are used for carrying out the method.

The inventive preparation is advantageously applied on the heated substrate, especially on glass, with a spray gun by means of a spraying-atomizing method that uses compressed air. The substrate should have a temperature of 400° to 800° C. The temperature of the substrate must, however, be below its respective melting or softening temperature.

Through pyrolysis, a tin oxide film doped with fluorine is thus produced on the substrate surface. This film has the properties of a semiconductor layer. Depending on the amount of inventive preparation used, a film with a thickness of 100 to 1,000 nm is obtained. Therefore, in accordance with the inventive method, selectively transparent coatings can be produced on glass. The coatings are largely transparent to visible light (75 to 83%), while infrared radiation with a wavelength longer than about 2,500 nm is reflected to the extent of 80 to 90%, depending on the thickness of the layer.

The following examples serve to explain the invention further. It is understood that these examples are given by way of illustration and not by way of limitation.

EXAMPLE 1

To a 100 mL glass flask equipped with magnetic stirrer are added
 20.0 g ethyl alcohol,
 70.0 g butyl tin trichloride and
 10.0 g of a 25% by weight aqueous SnF$_2$ solution.

The mixture is mixed with stirring and cooling.

5 mL of this solution is filled into the bowl of a spray gun (nozzle diameter 1 mm; spraying pressure 4 bar) and sprayed onto a flat glass pane (160×180×6 mm), which had previously been heated for 5 minutes at a furnace temperature of 700° C. After cooling, the glass pane had the following values:

| layer thickness | 400 nm |
| --- | --- |

| | |
|---|---|
| infrared reflection | 83.0% |
| surface resistance | 8.5 ohm/square |

EXAMPLE 2

To a 100 mL glass flask equipped with magnetic stirrer are added
52.0 g ethanol
46.1 g SnCl₄ and
1.9 g SnF₂ in powder form The mixture is mixed for 2 hours with stirring and cooling. The solution thus obtained has a slight cloudiness, which is removed by filtration.

5 mL of this solution is used to improve a glass surface as in Example 1. After cooling, the glass pane has the following values:

| | |
|---|---|
| layer thickness | 350 nm |
| infrared reflection | 80.0% |
| surface resistance | 17.0 ohm/square |

EXAMPLE 3

To a 100 mL glass flask equipped with a magnetic stirrer are added
70.0 g butyl tin trichloride
22.0 g ethyl acetate
6.0 g water and
2.0 g SnF₂ in powder form The mixture is mixed with stirring and cooling. The solution is filtered until it is clear.

5 mL of this solution is used to improve a glass pane as in Example 1. After cooling, the glass pane has the following values:

| | |
|---|---|
| layer thickness | 400 nm |
| infrared reflection | 83.0% |
| surface resistance | 8.3 ohm/square |

I claim:

1. In a method for the formation of electrically conductive and infrared-reflecting tin oxide layers on a glass or glass-ceramic substrate, wherein an organic solution containing tin-IV-chloride, with or without organic groups, as tin oxide layer-forming agent and a fluorine-containing doping agent is sprayed on the surface of the substrate having a temperature of 400° to 800° the improvement which comprises that the solution contains tin-II-fluoride as the sole doping agent.

2. A method of forming an electrically conductive, infrared-reflecting fluorine-doped tin oxide layer on the surface of a glass or glass-ceramic substrate, which comprises:
    (a) heating the substrate to a temperature of between about 400°–800° C. but below the melting or softening temperature of the substrate, and
    (b) spraying onto the heated substrate a solution comprising tin-IV chloride and tin-II fluoride, wherein tin-II fluoride is the sole doping agent in the solution.

3. The method of claim 2, wherein the solution is selected from the group of solutions consisting of between about
    (1) 30 to 89% by weight of tin tetrachloride or alkyl tin trichloride,
    1 to 5% by weight of tin-II-fluoride,
    10 to 55% by weight of a polar organic solvent and
    0 to 10% water;
    (2) 30 to 89% by weight of tin tetrachloride or butyl tin trichloride,
    1 to 5% by weight tin-II-fluoride,
    10 to 55% by weight of a solvent selected from the group consisting of ethanol and ethyl acetate and
    0 to 10% by weight of water; and
    (3) 30 to 89% by weight of tin tetrachloride or butyl tin trichloride,
    1 to 5% by weight of tin-II-fluoride and
    10 to 65% by weight of ethanol; and
    (4) 30 to 89% by weight of tin-IV-chloride, 1 to 5% by weight of tin-II fluoride 10 to 55% by weight of a polar organic solvent, and 0 to 10% by weight of water.

4. A glass or glass-ceramic substrate having a surface layer obtained by the method of claim 2.

5. A glass or glass-ceramic substrate having a surface layer obtained by the method of claim 3.

6. The glass or glass-ceramic substrate of claim 4, wherein said layer has a thickness of between about 100 to 1000 nm.

7. The glass or glass-ceramic substrate of claim 5, wherein said layer has a thickness of between about 100 to 1000 nm.

8. The method of claim 2, wherein tin-IV chloride comprises at least one organic group.

* * * * *